(12) United States Patent
Zhao (10) Patent No.: US 10,271,092 B2
(45) Date of Patent: Apr. 23, 2019

(54) TELEVISION CHANNEL SWITCHING METHOD AND TELEVISION

(71) Applicant: HISENSE ELECTRIC CO., LTD., Qingdao (CN)

(72) Inventor: Yongjian Zhao, Qingdao (CN)

(73) Assignees: Hisense Electric Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 15/392,000

(22) Filed: Dec. 28, 2016

(65) Prior Publication Data

US 2017/0111685 A1    Apr. 20, 2017

(30) Foreign Application Priority Data

Jun. 17, 2016 (CN) .......................... 2016 1 0440297

(51) Int. Cl.
| | |
|---|---|
| H04N 21/438 | (2011.01) |
| H04N 21/482 | (2011.01) |
| H04N 21/472 | (2011.01) |
| H04N 21/442 | (2011.01) |

(52) U.S. Cl.
CPC ... *H04N 21/4383* (2013.01); *H04N 21/44209* (2013.01); *H04N 21/44222* (2013.01); *H04N 21/472* (2013.01); *H04N 21/4821* (2013.01); *H04N 21/4826* (2013.01)

(58) Field of Classification Search
CPC ............. H04N 21/4383; H04N 21/433; H04N 21/44209; H04N 21/472; H04N 21/4821; H04N 21/4826

USPC .......................................................... 725/39
See application file for complete search history.

(56) References Cited

U.S. PATENT DOCUMENTS

| | | | | |
|---|---|---|---|---|
| 6,985,190 B1* | 1/2006 | Klopfenstein | ............ | H04N 5/50 348/569 |
| 8,453,181 B1* | 5/2013 | Johnson | .................... | H04N 5/44 348/731 |
| 2004/0114052 A1* | 6/2004 | Sin | ........................... | H04N 5/50 348/570 |

(Continued)

FOREIGN PATENT DOCUMENTS

| | | |
|---|---|---|
| CN | 1361978 A | 7/2002 |
| CN | 1750607 A | 3/2006 |

(Continued)

OTHER PUBLICATIONS

Office Action from Chinese Application No. 201610440297.2 dated Jun. 14, 2018 (9 pages), Only citation of references was translated and considered.

*Primary Examiner* — Nathan J Flynn
*Assistant Examiner* — Cynthia M Fogg
(74) *Attorney, Agent, or Firm* — Harness, Dickey & Pierce, P.L.C.

(57) ABSTRACT

This disclosure discloses a television channel switching method and a television. The method includes: determining that a first channel being played enters into a no-signal state; displaying a commonly-used channel list, wherein the commonly-used channel list is determined according to a preset rule; and switching from the first channel to a second channel in the commonly-used channel list, wherein the second channel and the first channel are different channels.

17 Claims, 4 Drawing Sheets

| Channel A | Channel number | Channel name | Channel frequency | Number of playing | Playing time |
|---|---|---|---|---|---|
| Channel B | Channel number | Channel name | Channel frequency | Number of playing | Playing time |
| Channel C | Channel number | Channel name | Channel frequency | Number of playing | Playing time |
| Channel D | Channel number | Channel name | Channel frequency | Number of playing | Playing time |

(56) References Cited

U.S. PATENT DOCUMENTS

| | | | | |
|---|---|---|---|---|
| 2005/0079821 A1* | 4/2005 | Bi | ................. | H04L 12/1877 |
| | | | | 455/63.1 |
| 2006/0033846 A1* | 2/2006 | Ozaki | ................. | H04N 5/4401 |
| | | | | 348/731 |
| 2007/0136751 A1* | 6/2007 | Garbow | ................. | H04N 7/173 |
| | | | | 725/46 |
| 2008/0020702 A1* | 1/2008 | Jendbro | ................. | H03J 1/0075 |
| | | | | 455/3.01 |
| 2009/0070827 A1* | 3/2009 | Barroso | ................. | H04N 7/173 |
| | | | | 725/68 |
| 2012/0151525 A1* | 6/2012 | Demchenko | ......... | H04N 21/482 |
| | | | | 725/39 |
| 2013/0051220 A1* | 2/2013 | Ryshakov | ........... | H04L 12/4625 |
| | | | | 370/221 |
| 2013/0219435 A1* | 8/2013 | Pattison | ............. | H04N 21/4383 |
| | | | | 725/68 |
| 2014/0053215 A1* | 2/2014 | Murakami | ............... | H04N 5/50 |
| | | | | 725/62 |
| 2015/0215159 A1* | 7/2015 | Liao | ................. | H04L 5/1438 |
| | | | | 370/225 |
| 2016/0014464 A1 | 1/2016 | Baskaran et al. | | |

FOREIGN PATENT DOCUMENTS

| | | |
|---|---|---|
| CN | 101110934 A | 1/2008 |
| CN | 102833503 A | 12/2012 |

\* cited by examiner

| Channel A | Channel number | Channel name | Channel frequency | Number of playing | Playing time |
| Channel B | Channel number | Channel name | Channel frequency | Number of playing | Playing time |
| Channel C | Channel number | Channel name | Channel frequency | Number of playing | Playing time |
| Channel D | Channel number | Channel name | Channel frequency | Number of playing | Playing time |

TELEVISION CHANNEL SWITCHING METHOD AND TELEVISION

CROSS-REFERENCE TO RELATED APPLICATION

This application claims benefits and priority of Chinese Patent Application No. 201610440297.2 filed Jun. 17, 2016. The entire disclosure of the above application is incorporated herein by reference.

FIELD

The present disclosure relates to the technical field of televisions, in particular to a television channel switching method and a television.

BACKGROUND

This section provides background information related to the present disclosure which is not necessarily prior art.

When a user is watching a television program, the television will show words of "no signal" if the channel does not have a signal or the signal is too weak to play. In this case, the user usually selects to switch to other channels, or waits for signal restoration of the channel. If the channel that the user switches to still has no signal, or after the user waits for a period of time, the signal of the current channel is not restored yet, the user is likely to turn off the television.

Figure 1:
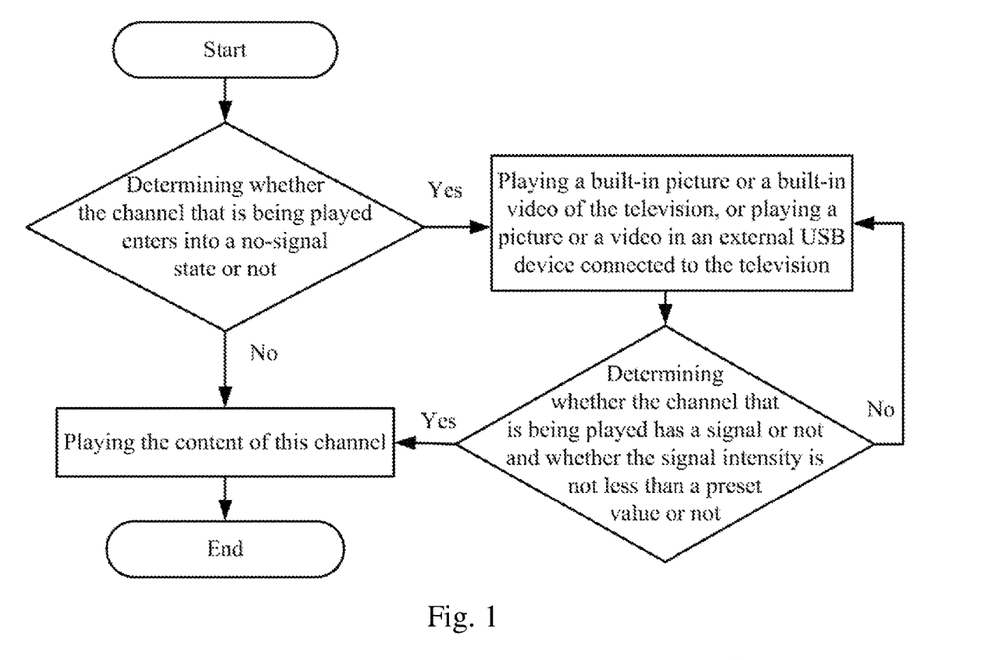
FIG. 1 is a schematic diagram of a flow of a method for guiding a user to continuously use a television service in related technology.

At present, in the case that a channel has no signal or the signal is too weak to play, a television mainly adopts a method as shown in FIG. 1 to guide a user to continuously use a television service. The method specifically includes: setting a background program; playing built-in pictures or videos of the television or playing pictures or videos in an external USB (Universal Serial Bus) device connected to the television when the channel that is being played enters into a no-signal state; and when the television determines that the channel that is being played has a signal and the signal intensity is not less than a preset value, i.e., the television determines that the signal of the channel that is being played is restored, switching to the channel by the television to continuously play the content of the channel.

SUMMARY

This section provides a general summary of the disclosure, and is not a comprehensive disclosure of its full scope or all of its features.

In a first aspect, some embodiments of this disclosure provide a television channel switching method, including:
 determining that a first channel being played enters into a no-signal state;
 displaying a commonly used channel list, wherein the commonly-used channel list is determined according to a preset rule; and
 switching from the first channel to a second channel in the commonly-used channel list, wherein the second channel and the first channel are different channels.

In a second aspect, some embodiments of this disclosure provide a television, including:
 a first processing module configured to determine that a first channel being played enters into a no-signal state;
 a second processing module configured to display a commonly-used channel list, wherein the commonly-used channel list is determined according to a preset rule; and
 a third processing module configured to switch from the first channel to a second channel which is in the commonly-used channel list and displayed by the second processing module, wherein the second channel and the first channel are different channels.

In a third aspect, some embodiments of this disclosure provide another television, including a memory storing a computer readable program and at least one processor, wherein the processor executes the computer readable program to:
 determine that a first channel being played enters into a no-signal state;
 display a commonly-used channel list, wherein the commonly-used channel list is determined according to a preset rule; and
 switch from the first channel to a second channel which is in the commonly-used channel list, wherein the second channel and the first channel are different channels.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 2:
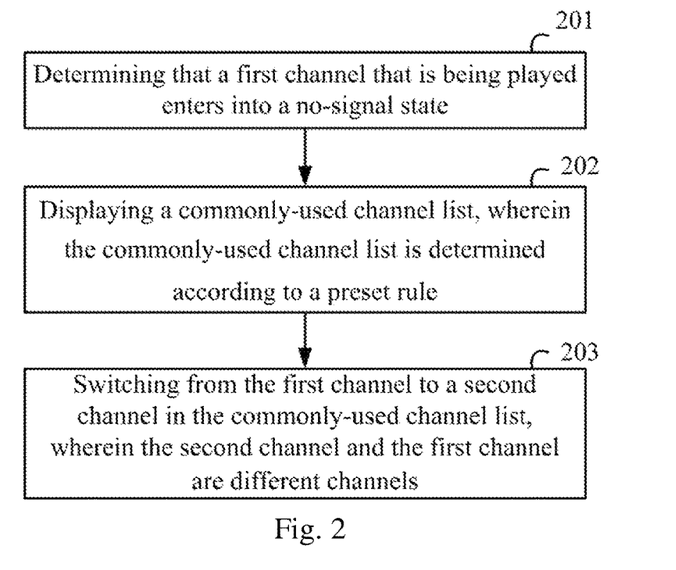
FIG. 2 is a schematic diagram of a flow of a method for switching channels by a television in some embodiments of this disclosure.

As shown in FIG. 2, in some embodiments of this disclosure, the flow of the method for switching channels by a television includes the steps as follows:

Step 201: determining that a first channel that is being played enters into a no-signal state.

Wherein the no-signal state of the channel includes two cases, namely, the channel has no signal and the signal intensity of the channel is less than a preset value. In some embodiments, the signal intensity of this channel is obtained according to the frequency of the channel so as to judge whether this channel has a signal or whether the signal intensity is less than the preset value.

In some embodiments, after determining that the first channel that is being played enters into a no-signal state, a no-signal prompt interface is presented.

Step 202: displaying a commonly-used channel list, wherein the commonly-used channel list is determined according to a preset rule.

In some embodiments, the commonly-used channel list is determined before the commonly-used channel list is displayed, wherein the commonly-used channel list does not include the first channel.

In some embodiments, by counting the number of playing and the playing time of each channel, channels of which the numbers of playing and/or the playing time are greater than preset threshold values are selected to form the commonly-used channel list, wherein various channels in the commonly-used channel list are ranked according to the numbers of playing and/or the playing time.

In some embodiments, when a channel is played normally, the number of playing and the playing time of the played channel are counted. Where, when a television is switched from a channel A to a channel B, the number of playing of the channel B is added with 1, and timing is started at the same time; and when the channel B is stopped playing, the timing is ended, and the calculated time is added to the playing time of the channel B.

The information of each channel is recorded by a data structure of channel information which includes key information such as a channel name, a channel number, a channel frequency, the number of playing and a playing time, etc. A channel information data base is established for storing information of all channels, wherein each record in the channel information data base adopts the data structure of channel information.

In some embodiments, since the channel name may be changed, the channel number is the only index for searching the channel.

In some embodiments, the methods for determining the commonly-used channel list according to a preset rule include but not limited to the following three methods:

The first method includes: obtaining the number of playing of each channel from the channel information data base, and selecting the channels of which the numbers of playing are greater than a preset threshold value to form the commonly-used channel list in which each channel is ranked according to an order of the numbers of playing from large to small. Where, if there are two channels with same numbers of playing, the order of the two channels in the commonly-used channel list is determined according to the playing time of the two channels, i.e., the channel with a longer playing time is ranked in front of the channel with a shorter playing time.

The second method includes: obtaining the playing time of each channel from the channel information data base, and selecting the channels of which the playing time is greater than a preset threshold value to form the commonly-used channel list in which each channel is ranked according to an order of the playing time from large to small. Where, if there are two channels with the same playing time, the order of the two channels in the commonly-used channel list is determined according to the numbers of playing of the two channels, i.e., the channel with a larger number of playing is ranked in front of the channel with a smaller number of playing.

The third method includes: integrating the number of playing and the playing time of each channel obtained from the channel information data base to determine the commonly-used channel list. The weight coefficient of the numbers of playing and the weight coefficient of playing time of the channels are predefined. For any one channel, the weighted average value of the number of playing and the playing time of the channel is calculated according to a calculation formula: the weighted average value of the channel=the weight coefficient of the number of playing×the number of playing+the weighted coefficient of the playing time×the playing time. The channels of which the weighted average values are greater than a preset threshold value are selected to form the commonly-used channel list in which each channel is ranked according to an order of the weighted average values from large to small.

In some embodiments, before the commonly-used channel list is displayed, the signal intensity of each channel in the commonly-used channel list is detected, the channels which do not have signals and of which the signal intensities are less than a preset value in the commonly-used channel list are determined, and the channels which do not have signals and of which the signal intensities are less than the preset value in the commonly-used channel list are deleted.

In some embodiments, a tuner is adopted to detect the signal intensity of each channel in the commonly-used channel list, wherein the tuner is one of at least two tuners deposited in a television.

Step 203: switching from the first channel to a second channel in the commonly-used channel list, wherein the second channel and the first channel are different channels.

In some embodiments, there are multiple implementing methods for switching from the first channel to the second channel in the commonly-used channel list, including but not limited to:

The first method includes: switching from the first channel to the second channel in the commonly-used channel list according to user operation. Optionally, displaying the commonly-used channel list after determining that the first channel that is being played enters into a no-signal state, and switching from the first channel to the second channel in the commonly-used channel list according to operation performed by a user based on the commonly-used channel list. Where, the television can display the commonly-used channel list in a no-signal prompt interface of a screen.

The second method includes: automatically switching to the second channel in the commonly-used channel list according to a preset rule if no user operation is detected in a preset time.

In some embodiments, if no user operation is detected in a preset time, automatically switching from the first channel to any one channel in the commonly-used channel list, or automatically switching from the first channel to a channel at the top of the commonly-used channel list.

In some embodiments, after determining that the first channel enters into a no-signal state, starting timing, and automatically switching from the first channel to the second channel in the commonly-used channel list if determining that the time during which the first channel is in the no-signal state exceeds a preset threshold value.

In some embodiments, further playing the first channel if the time during which the first channel is in a no-signal state is determined as not exceeding a preset threshold value, a signal of the first channel is redetected, and the signal intensity of the first channel is determined as not less than a preset value.

In some embodiments, after switching from the first channel to the second channel in the commonly-used channel list, switching from the second channel to the first channel if determining that a signal of the first channel is redetected and the signal intensity of the first channel is not less than a preset value.

Figure 3:
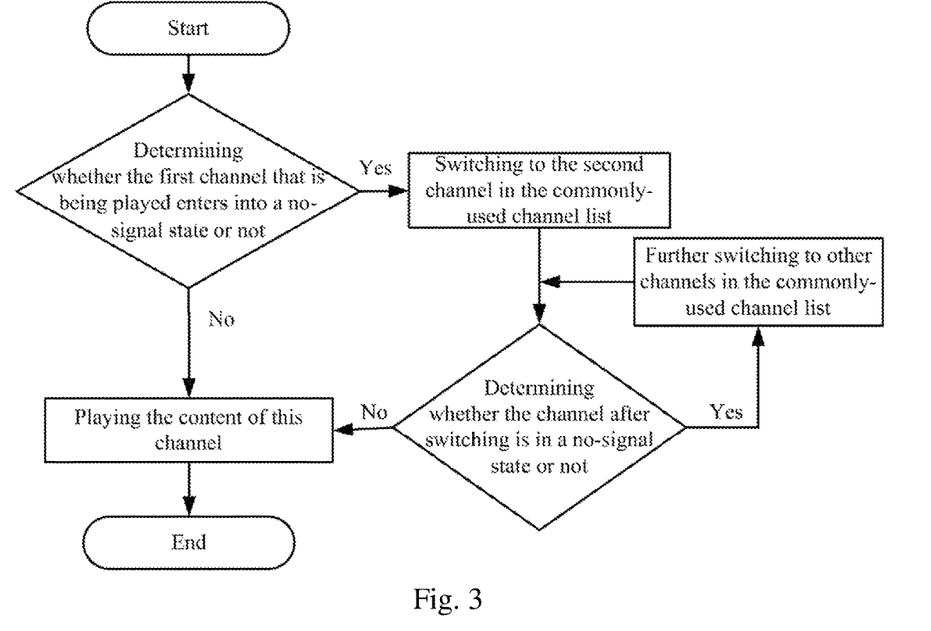
FIG. 3 is a schematic diagram of a channel switching process in some embodiments of this disclosure.

In some embodiments, the television can perform channel switching according to the method as shown in FIG. 3: prompting a user to switching to the second channel in the commonly-used channel list when determining that the first channel that is being played enters into a no-signal state, and further switching to other channels except the second channel in the commonly-used channel list if the second channel is in a no-signal state until the channel after switching has signals and the signal intensity is greater than a preset value, i.e., the signal intensity of the channel meet a play requirement to play the content of the channel.

Figure 4:
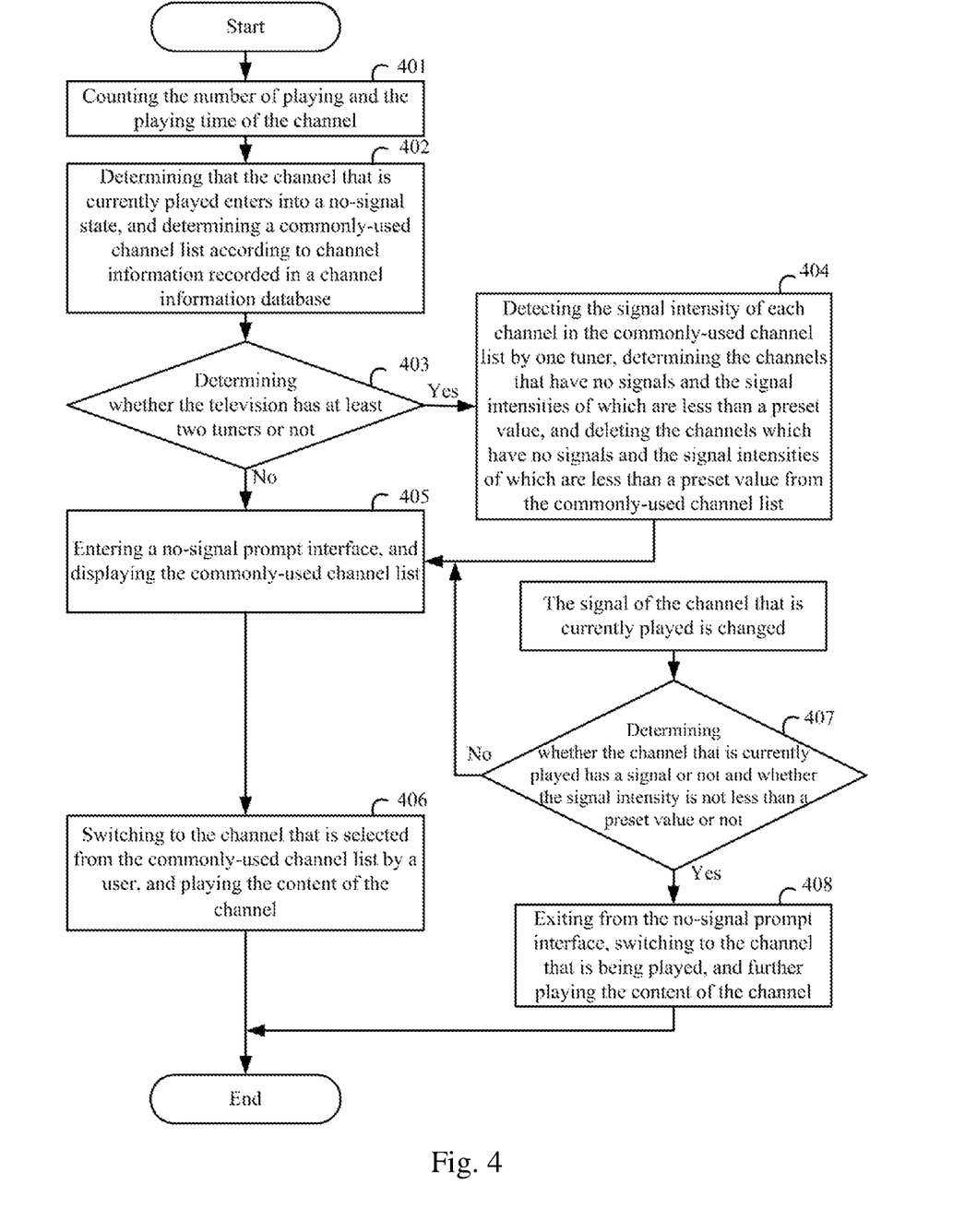
FIG. 4 is a schematic diagram of a detailed method flow for switching channels by a television in some embodiments of this disclosure.

In the embodiments of this disclosure, as shown in FIG. 4, the flow of the method for switching channels by the television is detailed as follow:

Step 401: when a channel is played normally, the television counts the number of playing and the playing time of the played channel. Where, when the television switches from a channel A to a channel B, the number of playing of the channel B is added with 1, and timing is started at the same time; and when the television stops playing the channel B, the timing is ended, and the calculated time is added to the playing time of the channel B.

Figure 5:
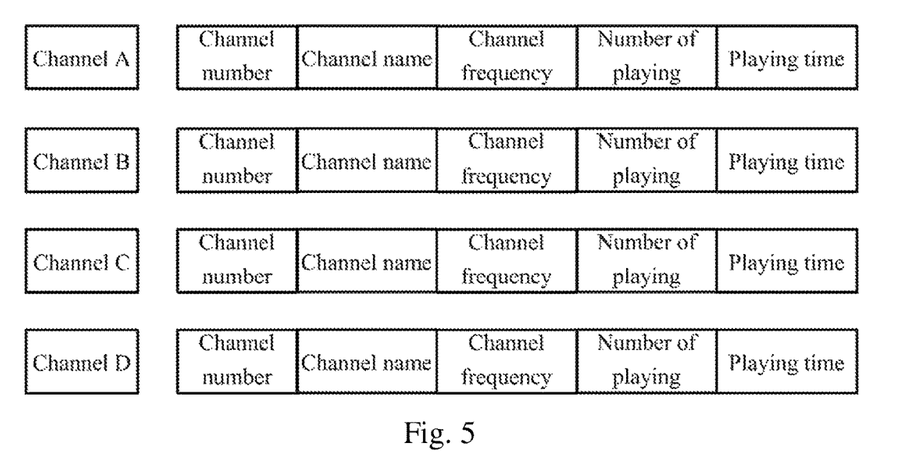
FIG. 5 is a schematic diagram of a data structure of channel information in some embodiments of this disclosure.

In some embodiments, the television adopts a data structure of channel information as shown in FIG. 5 to record information of each channel, and the data structure of channel information includes key information, such as a channel name, a channel number, a channel frequency, the number of playing and a playing time, etc. The television establishes a channel information data base for storing information of all channels, wherein each record in the channel information data base adopts the data structure of channel information.

In some embodiments, since the channel name may be changed, the channel number is the only index for searching the channel.

Step 402: the television determines that the channel that is currently played enters into a no-signal state, and determines the commonly-used channel list according to the channel information recorded in the channel information data base.

In some embodiments, when the television determines that the channel that is currently played enters into a no-signal state, a signal processing module in the television will send an event notice corresponding to the fact that the channel that is currently played enters into the no-signal state to an upper layer television interface. The upper layer television interface receives the notice, acquires channel information by searching the channel information data base, determines the commonly-used channel list, and deletes the channel that is currently played from the commonly-used channel list.

In some embodiments, the television acquires channel information by searching the channel information data base, and the methods for determining the commonly-used channel list include but not limited to the following three methods:

The first method includes: obtaining the number of playing of each channel from the channel information data base, and selecting the channels of which the numbers of playing are greater than a preset threshold value to form the commonly-used channel list in which each channel is ranked according to an order of the numbers of playing from large to small. Where, if there are two channels with the same numbers of playing, the order of the two channels in the commonly-used channel list is determined according to the playing time of the two channels, i.e., the channel with a longer playing time is ranked in front of the channel with a shorter playing time.

The second method includes: obtaining the playing time of each channel from the channel information data base, and selecting the channels of which the playing time is greater than a preset threshold value to form the commonly-used channel list in which each channel is ranked according to an order of the playing time from large to small. Where, if there are two channels with same playing time, the order of the two channels in the commonly-used channel list is determined according to the numbers of playing of the two channels, i.e., the channel with a larger number of playing is ranked in front of the channel with a smaller number of playing.

The third method includes: integrating the number of playing and the playing time of each channel obtained from the channel information data base to determine the commonly-used channel list. The weight coefficient of the numbers of playing and the weight coefficient of playing time of the channels are predefined. For any one channel, the weighted average value of the number of playing and the playing time of the channel is calculated according to a calculation formula: the weighted average value of the channel=the weight coefficient of the number of playing x the number of playing+the weighted coefficient of the playing time x the playing time. The channels of which the weighted average values are greater than a preset threshold value are selected to form the commonly-used channel list in which each channel is ranked according to an order of the weighted average values from large to small.

Step 403: the television judges whether it has at least two tuners or not. If the television has two tuners, the follow-up steps are carried out after carrying out the step 404; otherwise, the step 405 is carried out directly.

Step 404: the television detects the signal intensity of each channel in the commonly-used channel list by one tuner, determines the channels which have no signal and of which the signal intensity is less than a preset value, and deletes the channels which have no signal and of which the signal intensity is less than the preset value from the commonly-used channel list.

In some embodiments, the television obtains the signal intensity of the channel according to the frequency of each channel in the commonly-used channel list.

Step 405: the television enters into a no-signal prompt interface, and shows the commonly-used channel list in the interface.

Step 406: the television switches to a channel selected from the commonly-used channel list by a user, and plays the content of the channel.

After the step 402 is carried out, the following steps are further carried out:

Step 407: the television detects whether the channel that is currently played has a signal or not, and whether the signal intensity is not less than a preset value or not. If the channel has a signal, the signal intensity is not less than a preset value, and the television currently has entered into the no-signal prompt interface, then the step 408 is carried out; otherwise, the step 405 is carried out.

Step 408: the television exits from the no-signal prompt interface, switches to the channel that is currently played, and further plays the content of the channel.

Figure 6:
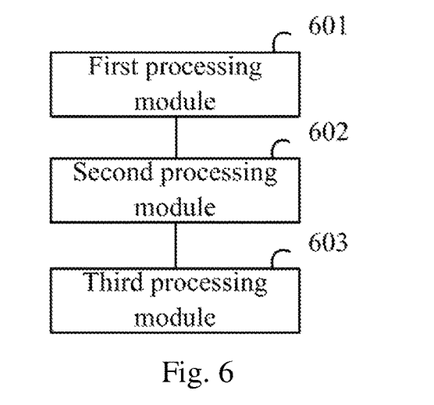
FIG. 6 is a schematic diagram of a structure of a television in some embodiments of this disclosure.

Based on the same inventive concept, some embodiments of this disclosure also provide a television, the specific implementation of the television may refer to description of the method embodiments, and it will not be repeated here. As shown in FIG. 6, the television includes:

a first processing module 601 configured to determine that a first channel that is being played enters into a no-signal state;

a second processing module 602 configured to display the commonly-used channel list, wherein the commonly-used channel list is determined according to a preset rule; and a third processing module 603 configured to switch from the first channel to the second channel which is in the commonly-used channel list and displayed by the second processing module 602, wherein the second channel and the first channel are different channels.

In some embodiments, the second processing module 602 is further configured to: before displaying the commonly-used channel list, detect the signal intensity of each channel in the commonly-used channel list, determine the channels which do not have signals and of which the signal intensities are less than a preset value in the commonly-used channel list, and delete the channels which do not have signals and of which the signal intensities are less than the preset value from the commonly-used channel list.

In some embodiments, the third processing module 603 is further configured to: determine that the time the first channel is in a no-signal state exceeds a preset threshold value before switching from the first channel to the second channel in the commonly-used channel list.

In some embodiments, the third processing module 603 is further configured to: switch from the second channel to the first channel if a signal of the first channel is redetected and the signal intensity of the first channel is determined as not less than a preset value after switching from the first channel to the second channel in the commonly-used channel list.

In some embodiments, the commonly-used channel list does not include the first channel.

Based on the same inventive concept, some embodiments of this disclosure further provide a television, the specific implementation of the television may refer to description of the method embodiments, and it will not be repeated here. The television mainly includes a memory storing a computer readable program and at least one processor, wherein the processor executes the computer readable program to:

determine that a first channel that is being played enters into a no-signal state;

display the commonly-used channel list, wherein the commonly-used channel list is determined according to a preset rule; and switch from the first channel to the second channel which is in the commonly-used channel list and displayed by the second processing module, wherein the second channel and the first channel are different channels.

In some embodiments, the processor further executes the computer readable program to:

before displaying the commonly-used channel list, detect the signal intensity of each channel in the commonly-used channel list, determine the channels which do not have signals and of which the signal intensities are less than a preset value in the commonly-used channel list, and delete the channels which do not have signals and of which the signal intensities are less than the preset value from the commonly-used channel list.

In some embodiments, executing the computer readable program by the processor so as to switch from the first channel to the second channel in the commonly-used channel list includes:

switching to the second channel selected from the commonly-used channel list by a user; or switching to the second channel in the commonly-used channel list according to a preset rule if no user operation is detected in a preset time.

In some embodiments, the processor further executes the computer readable program to:

determine that the time the first channel is in a no-signal state exceeds a preset threshold value before switching from the first channel to the second channel in the commonly-used channel list.

In some embodiments, executing the computer readable program by the processor so as to determine that the first channel that is being played enters into a no-signal state includes:

determining that the first channel is in the no-signal state when the time the first channel is in the no-signal state exceeds a preset threshold value.

In some embodiments, the processor further executes the computer readable program to:

switch from the second channel to the first channel if a signal of the first channel is redetected and the signal intensity of the first channel is determined as not less than a preset value after switching from the first channel to the second channel in the commonly-used channel list.

In some embodiments, the commonly-used channel list does not include the first channel.

Based on the above technical solution, in embodiments of this disclosure, the television, after determining that the first channel that is being played enters into a no-signal state, directly switches from the first channel to the second channel in the commonly-used channel list; therefore, the problem that the television can only switch to fixed pictures or videos when the channel enters into the no-signal state is solved, the television can directly switch to a favorite channel of a user, the switching process is simple, and the switching efficiency is high.

Moreover, by detecting the signal intensity of each channel in the commonly-used channel list, determining the channels which do not have signals and of which the signal intensities are less than a preset value in the commonly-used channel list, and deleting the channels which do not have signals and of which the signal intensities are less than the preset value from the commonly-used channel list, the switching efficiency is further improved. The commonly-used channel list displayed by the television facilitates selection of channels by users through the commonly-used channel list.

Those skilled in the art should understand that the embodiments of this disclosure may provide a method, a system, or a computer program product. Therefore, this disclosure may adopt the forms of a complete hardware embodiment, a complete software embodiment, or a combination of software and hardware. Moreover, this disclosure may adopt a form of a computer program product that is implemented on one or more computer available storage media (including but not limited to magnetic disk memories, optical memories, etc.) including computer available program codes.

This disclosure is described with reference to flow diagrams and/or block diagrams of the method, the device (system), and the computer program product according to the embodiments of this disclosure. It should be appreciated that each flow and/or block in the flow diagrams and/or the block diagrams, and the combination of the flows and/or blocks in the flow diagrams and/or the block diagrams may be implemented by computer program instructions. These computer program instructions may be provided to a processor of a general-purpose computer, a dedicated computer, an embedded processor or other programmable data processing equipment to generate a machine to enable the instructions executed by the processor of the computer or other programmable data processing equipment to generate a device for achieving a designated function in one flow or multiple flows in a flow diagram and/or in one block or multiple blocks of a block diagram.

These computer program instructions may also be stored in a computer readable memory that can guide the computer or other programmable data processing equipment to work in a specific mode so that the instructions stored in the computer readable memory generate manufactured products including an instruction device which achieves a designated function in one flow or multiple flows in a flow diagram and/or in one block or multiple blocks of a block diagram.

These computer program instructions may also be loaded to the computer or other programmable data processing equipment so as to execute a series of operation steps on the computer or other programmable equipment to generate a processing achieved by the computer, so that the instructions executed on the computer or other programmable equipment provide steps for achieving a designated function in one flow or multiple flows in a flow diagram and/or in one block or multiple blocks of a block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A television channel switching method, the method comprising:
   determining whether a first channel being played enters into a no-signal state;
   in response to determining that the first channel being played enters into a no-signal state, displaying a commonly-used channel list in a no-signal prompt interface, the commonly-used channel list including channels having a signal intensity greater than a preset value;
   receiving a user selection of one of the channels from the commonly-used channel list;
   switching from the first channel to a second channel in the commonly-used channel list according to the user selection of the channel, wherein the second channel and the first channel are different channels;
   obtaining a playing time and a number of times played for each channel in the commonly-used channel list from a channel information database; and
   ranking the channels in the commonly-used channel list according to weighted average values of the obtained playing time and the obtained number of times played for each channel.

2. The method according to claim 1, wherein before displaying the commonly-used channel list, the method further comprises:
   detecting the signal intensity of each channel in the commonly-used channel list, determining channels which do not have signals and of which the signal intensities are less than the preset value in the commonly-used channel list, and deleting the channels which do not have signals and of which the signal intensities are less than the preset value from the commonly-used channel list.

3. The method according to claim 2, wherein detecting the signal intensity of each channel in the commonly-used channel list comprises:
   detecting the signal intensity of each channel in the commonly-used channel list by a tuner.

4. The method according to claim 1, wherein the method further comprises:
   automatically switching to the second channel in the commonly-used channel list according to a preset rule if no user selection is detected in a preset time period.

5. The method according to claim 1, wherein determining whether the first channel being played enters into a no-signal state comprises:
   determining that the first channel is in the no-signal state when a time during which the first channel is in the no-signal state exceeds a preset threshold value.

6. The method according to claim 5, wherein the method further comprises:
   in response to determining that the first channel is in the no-signal state and a time during which the first channel is in the no-signal state does not exceed the preset threshold value, re-detecting the signal intensity of the first channel; and
   when it is determined that the redetected signal intensity of the first channel is not less than the preset value, playing the content of the first channel.

7. The method according to claim 1, wherein after switching from the first channel to the second channel in the commonly-used channel list, the method further comprises:
   switching from the second channel to the first channel if a signal of the first channel is redetected and a redetected signal intensity of the first channel is determined as not less than the preset value.

8. The method according to claim 1, wherein the commonly-used channel list does not include the first channel.

9. The method according to claim 1, wherein a channel number of each of the channels is different from the other channels.

10. A television, comprising:
    a memory storing a computer readable program, and
    at least one processor, wherein the processor executes the computer readable program to:
    determine whether a first channel being played enters into a no-signal state;
    in response to determining that the first channel being played enters into a no-signal state, display a commonly-used channel list in a no-signal prompt interface, the commonly-used channel list including channels having a signal intensity greater than a preset value;
    receive a user selection of one of the channels from the commonly-used channel list;
    switch from the first channel to a second channel which is in the commonly-used channel list according to the user selection of the channel, wherein the second channel and the first channel are different channels;
    obtain a playing time and a number of times played for each channel in the commonly-used channel list from a channel information database; and
    rank the channels in the commonly-used channel list according to weighted average values of the obtained playing time and the obtained number of times played for each channel.

11. The television according to claim 10, wherein the processor further executes the computer readable program to:
before displaying the commonly-used channel list, detect the signal intensity of each channel in the commonly-used channel list, determine channels which do not have signals and of which the signal intensities are less than the preset value in the commonly-used channel list, and delete the channels which do not have signals and of which the signal intensities are less than the preset value from the commonly-used channel list.

12. The television according to claim 10, wherein the processor further executes the computer readable program to:
switch to the second channel in the commonly-used channel list according to a preset rule if no user selection is detected in a preset time period.

13. The television according to claim 10, wherein the processor further executes the computer readable program to:
determine whether a time during which the first channel is in the no-signal state exceeds a preset threshold value before switching from the first channel to the second channel in the commonly-used channel list.

14. The television according to claim 13, wherein the processor further executes the computer readable program to:
in response to determining that the first channel is in the no-signal state and a time during which the first channel is in the no-signal state does not exceed the preset threshold value, re-detect the signal intensity of the first channel; and
when it is determined that the redetected signal intensity of the first channel is not less than the preset value, play the content of the first channel.

15. The television according to claim 10, wherein the processor further executes the computer readable program to:
switch from the second channel to the first channel if a signal of the first channel is redetected and a redetected signal intensity of the first channel is determined as not less than a preset value after switching from the first channel to the second channel in the commonly-used channel list.

16. The television according to claim 10, wherein the commonly-used channel list does not include the first channel.

17. The television according to claim 10, wherein a channel number of each of the channels is different from the other channels.

* * * * *